Patented Aug. 25, 1953

2,650,203

UNITED STATES PATENT OFFICE 2,650,203

PREPARATION OF SILICATE ADSORBENTS

Russell J. Hawes, Cranford, N. J., and Charles C. Winding, Ithaca, N. Y., assignors to Tide Water Associated Oil Company, Bayonne, N. J., a corporation of Delaware No Drawing. Application February 15, 1951, Serial No. 211,186

8 Claims. (Cl. 252—457)

The present invention relates to the preparation of adsorbent materials and, more particularly, of silicate adsorbent materials adapted for refining of liquids, such as adsorbent decolorization of petroleum lubricating oils by the percolation method.

Those skilled in the art are aware of the use of solid adsorbent materials of natural or synthetic origin for removal of coloring matter or otherwise refining of liquids and solutions. The adsorbent treatment of petroleum fractions, especially oils of lubricating character, is an important illustrative example of such usage. For such treatment, two distinct methods are in general use, one of which is commonly designated as the "contact method" and the other as the "percolant method." These methods differ radically in manipulative detail and each is predicated upon and requires a distinct type and form of adsorbent material. The "contact method" comprises agitation of a slurry of the adsorbent and the liquid to be decolorized, followed by removal of the adsorbent from the decolorized liquid, and depends upon use of the adsorbent in such finely divided condition (e. g. about 200 to about 300 mesh) that hardness or resistance to attrition of the adsorbent particles is secondary to high activity and oil retention characteristics. On the other hand, the percolation method, in which the liquid is filtered through a bed of granular adsorbent particles and the adsorbent is alternatively revivified and reused numerous times, requires a relatively coarse granular adsorbent material (e. g. about 15 to 30 mesh, or about 30 to about 60 mesh, and the like), which must have a sufficient degree of hardness to withstand breakdown and, hence, avoid packing and high pressure drops through fixed bed filters as well as to minimize attrition losses. Thus, depending upon the contemplated usage of an adsorbent, distinct and different physical properties or characteristics are required thereof and a given size adsorbent material is not equally efficient and satisfactory as both a contact agent and a percolant. In other words, adsorbent compositions having the form and properties necessary for contact usage have no utility in the percolation method while adsorbent material of form and properties necessary for percolant usage will not function efficiently as a contact agent. The present invention is concerned with the preparation of the relatively hard granular type of adsorbent materials as distinguished from the soft powdery type.

As is apparent to those skilled in the art, an important aim in manufacture of a particular adsorbent material is the obtainment of the highest possible yield of material having particle size and other characteristics desired for the particular refining method in which the adsorbent is to be used. In the preparation of synthetic adsorbents for contemplated usage in the contact method, no particular difficulty is encountered in producing high yields of properly sized materials as, generally speaking, obtainment of the required finely divided materials in substantial amount is an inherent result of numerous adsorbent production methods and, even should larger than desired particle sizes be obtained in such methods, such particles are generally readily reducible by conventional methods, as by mechanical grinding, to the desired relatively small particle size suitable for contact treatment. A more difficult problem is involved, however, in the preparation of optimum yields of larger sized particles such as those suitable for percolant adsorbents as, in processes of which we are aware for direct production of such larger sized particles, a substantial amount of fines, i. e. particle sizes too small for the desired use, are unavoidably obtained and, especially so, in processes involving use of grinding or other reducing means. The efficiency of these processes is obviously decreased as the yield ratio of larger particles to fines is decreased. Hence, and for example, in processes for direct production of synthetic percolant adsorbents as the desired end product, and particularly adsorbents of the silicate type discussed more fully hereinafter, a marked advance in the art is represented by discoveries that lead to obtaining an increased yield ratio of percolant to fines. A still more marked advance in the art is represented by discoveries that provide for conversion of fines, such as those unavoidably produced during preparation of percolant-size materials, to hard percolant-size materials that possess activity and other properties desired of percolant adsorbents and which are as satisfactory for such usage as the percolant-size materials directly obtained in the process in which the fines are unavoidably produced. The present invention is directed to and has as its prime object the obtainment in improved yield of silicate adsorbents of desired particle size in a simple and efficacious process involving the conversion of particles of a suitable metal silicate finer than desired size to particles having the desired larger size and other desired adsorbent characteristics.

In one aspect, the invention is particularly adapted for application to processes for producing hard, synthetic silicate percolation grade adsorbents described in patents such as C. C. Winding, U. S. Patents Nos. 2,359,342 to 2,359,346, inclusive, to effect an increased yield of percolant adsorbent. The processes of those patents, incorporated by reference herein, comprise the precipitation, under controlled conditions, of a silicate of a metal replaceable in an ionic or base exchange reaction with an alkaline earth metal, including magnesium, drying the precipitate to a hard, grindable material, grinding the dried material to produce percolant-size particles (usually 30 to 60 mesh size) and subjecting the percolant-size materials to an ionic or base exchange reaction to replace the metal of said percipitated silicate with an alkaline earth metal. The resulting particles containing the "exchange" metal silicate are of substantially the same percolant-size as those entering the exchange reaction and possess high decolorizing activities, high resistance to attrition and other properties desired in percolant adsorbents.

In the step of grinding the dried precipitate in the aforedescribed processes, the production of an appreciable proportion of fines, i. e. particles of smaller than desired percolant-size, is unavoidable when using conventional, presently available grinding means. Such fines, though of relatively hard structure, if subjected to the aforestated ionic or base exchange reaction, are not thereby increased in size to form the desired percolant-size material and hence have heretofore been considered as loss for this purpose. In accordance with one embodiment or application of the present invention, these fines may be recovered in the process as useful percolant adsorbent as will be fully described hereinafter.

Accordingly, one object of the invention is to provide an improved process for the production of percolant grade silicate adsorbent through ionic or base exchange reaction. Another object is to improve the ratio of percolant grade silicate adsorbent to fines produced in a process for making percolant grade adsorbents involving an ionic or base exchange reaction by conversion of fines to percolant-size particles for use in the exchange reaction.

A broader object is to convert relatively small particles of a silicate of a metal, replaceable by an alkaline earth metal in an ionic or base exchange reaction, to larger particles suitable for use in said exchange reaction to produce active silicate material. A more specific object is to convert relatively small particles of a silicate of a metal, replaceable by magnesium in an ionic or base exchange reaction, to larger particles suitable for use in said exchange reaction to produce a hard, active magnesium silicate material.

The invention is based on the discovery that smaller than desired size particles of a suitable metal silicate can be converted in substantial proportional amount to particles of larger desired size by utilization of said smaller particles as a mass of controlled particle size characteristics which is incorporated or recycled in processes directed to preparation of hard granular larger sized particles of a silicate of a metal replaceable in cation or base exchange reaction by an alkline earth metal which, for purposes herein, includes barium, strontium, calcium and magnesium. By practice of this invention, and as is apparent from the data set forth hereinafter, not only are increased yields of desired size particles obtained by conversion of smaller size particles thereto but, additionally and of considerable importance, the thus converted particles upon being subjected to the aforesaid exchange reaction possess hardness and activity characteristics comparable to the particles of desired size directly producible from said processes but in which resort to practice of this invention is not employed.

With respect to the controlled particle size characteristics of the mass utilized in practice of this invention, such a mass must have a relatively low average particle size sufficient to agglomerate or otherwise form with the precipitated silicate a mass that is driable to a hard mass grindable to granular particles of desired size. Preferably, the average particle size of the mass employed should not exceed about 50 microns with preferred usage being made of a mass having an average particle size substantially less than 50 microns and substantially devoid of or containing less than an appreciable amount of larger size particles. Thus, and although a minor fraction of particles larger than about 50 microns in size may be tolerated in the mass employed, the presence of such larger size particles is not of particular advantage but tends to reduce the effectiveness of the process as experimental investigation indicates that larger than 50 micron particles are not readily if at all permanently agglomeratable per se or with the precipitated silicate to the desired final product and their presence in the mass employed does not appear to have any beneficial effect.

Although the scope of this invention is intended to include practice thereof with precipitated silicates of a metal replaceable in the aforestated exchange reaction to form hard, non-readily powderable active adsorbents and which may be produced by processes other than disclosed in the aforesaid Winding patents, the invention is of particular utility as an improvement of the Winding patent processes. Hence, for purposes of illustration and not limitation, the invention is described hereinafter with emphasis on said processes, a specific illustration thereof being the following procedural operations for preparation of hard granular synthetic magnesium silicate adsorbents of percolant size.

(a) A 0.3 molar aqueous solution of sodium silicate (based on $Na_2O$ content) is heated to 200° F. and, while vigorously stirring the silicate solution, an equivalent amount of a 0.3 molar aqueous solution of calcium chloride or a calcium chloride-magnesium chloride mixture in 3:1 molar ratio is rapidly added to the silicate solution, the chloride solution also having been heated to 200° F. The reactant mixture is stirred for 5 minutes while maintaining the temperature at 200° F.

(b) The hot suspension resulting from (a) is filtered to provide a filter cake of precipitated metal silicate (e. g. precipitated calcium silicate or mixed calcium and magnesium silicates).

(c) The filter cake obtained from (b) is washed with hot water to remove water-soluble salts, and dried by suction.

(d) The thus dried filter cake is then subjected to further drying by placing the filter cake in a furnace preheated to about 550° C. and heated therein for about one to about two hours to provide a hard material which can be ground to hard discrete particles.

(e) The dried filter cake obtained from (d) is ground by suitable means (e. g. a hammer mill) until the cake has been reduced to particles passing through a 30 mesh screen. The material is then classified into particles that (1) pass through a 30 mesh screen but are retained on a 60 mesh screen and are of percolant-size, and (2) into material that passes through the 30 mesh screen and which is smaller than desired size for use as percolants.

(f) The particles of 30 to 60 mesh size obtained from (e) are then subjected to cation or base exchange reaction with a 0.3 molar aqueous solution of magnesium chloride by adding the particles to the solution heated to 200° F. and decanting the solution after a contact period of one hour. The treatment with the magnesium chloride solution is repeated twice with fresh batches of magnesium chloride solution except that the hot solution is added to the wet silicate. The thus treated silicate is washed, filtered, and dried overnight at 135° C., to provide hard granular percolant-size synthetic magnesium silicates that possess a decolorizing activity of about 160 (volume percent Florex Fuller's earth) and are resistant to attrition as evidenced by values as low as 19.6% upon being subjected to a breakdown test as described hereinafter.

In such a process, the yield of smaller than desired materials produced in (e) usually amounts to about 20 to 30%, a yield of 27.4% based on the weight of the dried precipitated silicate being a specific illustration thereof. Such smaller than desired size material usually ranges in size from about 74 or less to about 246 microns.

In accordance with this invention, the smaller than desired particles such as obtained in (e) are reduced by suitable means to a mass having controlled particle size characteristics as aforesaid for suitable practice of this invention and the thus reduced mass is introduced (hereinafter termed "recycle" for convenience) into a process as aforedescribed at a stage therein prior to (d), i. e. prior to drying of the precipitated silicate to a hard mass grindable to hard discrete particles. Thus, and as shown hereinafter, such a precipitated silicate of smaller than desired particle size characteristics, but of controlled particle size, can be introduced into processes illustrated by the process described in detail hereinbefore at various stages therein, examples of which include introduction in the precipitation step, as by admixture with one or more of the precipitant solutions, or admixture with the precipitated silicate prior to drying thereof, with effective conversion of the smaller than desired particles to percolant-size materials.

The effective conversion of smaller than desired particles to particles of larger desired size by practice of this invention with a process as described in detail hereinbefore is illustrated by Examples Nos. 2 to 5 in Table I set forth hereinafter. For purposes of comparison, Table I also includes Example 1 which relates to the aforedescribed process but in which utilization of this invention was not resorted to.

The process employed for preparation of the materials for which data are shown in Examples 2 to 5 comprised use of finer than 60 mesh material produced in (e) of the aforedescribed process, reduction of said material to a mass having particle size characteristics shown for each example by use of a grinding mill of the type specifically shown for each example, introduction (recycle) of the thus reduced mass into the process described in detail hereinbefore by admixture of said mass with the sodium silicate solution, and subjecting the admixture to the procedural steps (a) to (f) as aforedescribed.

In Table I, the values shown for "ground mass recycled, per cent of total precipitated silicate" designate the amount by weight (per cent recycle) of reduced mass introduced into the process correlated with use of an amount of reactants (e. g. sodium silicate and chloride salt) to produce with the recycled mass a total of 100 parts of dried, precipitated filter cake. For example, a 30% recycle means that of the dried filter cake obtained, 70% thereof was derived by reaction between the sodium silicate and chloride salt and the remaining 30% from the mass of precipitated silicate particles recycled to the process. The values shown for "per cent finer than 60 mesh on grinding" represent the amount by weight (per cent fines) of finer than 60 mesh material obtained by grinding to percolant-size the dried precipitated silicate obtained in each example. The values for "per cent breakdown of Mg exchanged percolant particles" represent the amount by weight of finer than 60 mesh material obtained by subjecting to a breakdown tests as described hereinafter the magnesium exchanged percolant-size particles obtained in each example, and the "decolorizing activity—volume per cent Florex Fuller's earth" designates the decolorizing activity of the percolant-size magnesium exchanged particles upon being subjected to the decolorizing test described hereinafter.

*Table I*

| Example No. | Grinding Method | Particle Size of Recycled Mass (in microns) | Ground Mass Recycled, Percent of Total Precipitated Silicate | Water Content of Recycled Mass (by weight) | Percent Finer Than 60 Mesh on Grinding | Percent Breakdown of Mg Exchanged Percolant Particles | Decolorizing Activity, Volume Percent Florex Fuller's Earth |
|---|---|---|---|---|---|---|---|
| 1 | | | 0 | | 27.4 | 19.6 | 160 |
| 2 | Colloid Mill | 1-5 | 17.4 | 11.0 | 29.5 | 18.2 | 151 |
| 3 | do | 1-5 | 16.1 | 58.9 | 29.3 | 18.2 | 149 |
| 4 | Ball Mill | Less than 1 to 50 | 17.2 | 5.7 | 27.9 | 17.0 | 164 |
| 5 | do | 1-50 | 16.7 | 60.0 | 29.4 | 17.7 | 154 |

As shown in Table I, the values for "per cent finer than 60 mesh on grinding" and "per cent breakdown of Mg exchanged percolant particles" of Examples 2 to 5 practiced in accordance with the invention are comparable to the corresponding values shown for Example 1. Such values evidence that in Examples 2 to 5, a substantial conversion of smaller than desired particles to percolant-size particles occurred as is apparent from the fact that whereas in Example 1 the dried precipitated silicate was wholly derived from reaction between the sodium silicate and the chloride salt, the dried precipitated silicate of Examples 2 to 5 was derived by use in the process of about 16.1 to 17.4% of the smaller than desired sized particles. Based on a "per cent recycle" of about 16 to 17%, the theoretical expected yield of fines in the absence of conversion would amount to about 39% but, as shown by the values for "per cent fines" in Examples 2 to 5, substantially lower than 39% of fines were obtained.

In Table II, set forth hereinafter, numerous additional examples are set forth illustrating the results obtained by practice of this invention. In that table, Examples 6 to 8, inclusive, show that by introduction of the recycled mass to the sodium silicate solution or to the dispersed filter cycle" employed in the absence of conversion of the recycled mass to percolant-size material.

Examples 16 to 24 show the use of recycled masses having average particle size characteristics as contemplated herein at relatively high "per cent recycle" values varying from 29.6% to 73% and, as shown by the values for "per cent fines," the yield of fines for each of Examples 16 to 24 was markedly less than the expected yield of fines in the absence of conversion at the recycle rates shown.

Table II

| Example No. | Grinding Method | Method of Addition of Recycled Mass | Particle Size of Recycled Mass (in microns) | | Ground Mass Recycled, Percent of Total Precipitated Silicate | Percent Finer Than 60 Mesh on Grinding | Percent Breakdown of Mg Exchanged Percolant Particles | Decolorizing Activity, Volume Percent Florex Fuller's Earth |
|---|---|---|---|---|---|---|---|---|
| | | | Range | Average | | | | |
| 1 | | | | | 0 | 27.4 | 19.6 | 160 |
| | Micronizer Mills | To dispersed filter cake | 1–10 | 3–4 | 28.7 | 26.4 | 19.4 | 143 |
| 6 | do | To sodium silicate solution | 1–10 | 3–4 | 30.9 | 30.0 | 20.7 | 147 |
| 7 | do | To dispersed filter cake | 1–10 | 3–4 | 49.8 | 28.9 | 24.2 | 142 |
| 8 | do | To sodium silicate solution | Less than 1 to 100 | 1–5 | 17.3 | 32.2 | 21.0 | 150 |
| 9 | Colloid Mill | do | Less than 1 to 110 | 1–5 | 17.1 | 33.1 | 20.8 | 162 |
| 10 | do | do | Less than 43 | 40 | 18.8 | 33.1 | 18.2 | |
| 11 | Hammer Mill | do | 104–37 | 48 | 17.3 | 35.0 | 20.5 | 148 |
| 12 | do | do | 53–43 | 48 | 19.1 | 34.7 | 21.6 | |
| 13 | do | do | 74–53 | 58 | 19.4 | 41.7 | 27.1 | |
| 14 | do | do | Larger than 74 | 80 | 18.9 | 46.8 | 36.0 | 165 |
| 15 | do | do | Less than 1 to 50 | 1–5 | 31.8 | 30.0 | 19.3 | 141 |
| 16 | Colloid Mill | do | Less than 1 to 100 | 1–5 | 32.0 | 37.7 | 20.7 | 137 |
| 17 | do | do | Less than 1 to 110 | 1–5 | 31.7 | 36.9 | 19.4 | 147 |
| 18 | do | do | Less than 1 to 50 | 15 | 30.9 | 32.3 | 17.3 | 141 |
| 19 | Ball Mill | do | Less than 1 to 90 | 20 | 30.3 | 36.9 | 21.7 | 144 |
| 20 | Micronizer | do | Less than 1 to 110 | 25 | 29.9 | 41.6 | 23.0 | 139 |
| 21 | do | do | Less than 1 to 150 | 25 | 29.6 | 41.0 | 25.4 | 142 |
| 22 | do | do | Less than 1 to 200 | 25 | 30.6 | 38.4 | 22.6 | 145 |
| 23 | do | do | 1–10 | 3–4 | 73.0 | 34.3 | 38.4 | 146 |
| 24 | do | do | | | | | | | cake in a process as described in detail hereinbefore comparable results are obtained with respect to "per cent fines," "per cent breakdown" and decolorizing activity. Examples 9 to 13 further illustrate the desired results obtained by practice of this invention using a recycled mass of particle size characteristics contemplated herein. The importance of using a low average particle size mass is illustrated by comparison of Examples 9 to 13 with Examples 14 and 15 wherein an average particle size mass of 58 and 80 microns, respectively, was used and which resulted in undesired increased values for "per cent fines" and "per cent breakdown." That the desired substantial conversion results by practice of this invention is clearly apparent upon comparison of values shown for "per cent fines" in the examples utilizing this invention with the value shown therefor for Example 1. In Example 1, a yield of 27.4% of fines was obtained upon grinding of the precipitated filter cake produced wholly from reaction of sodium silicate and the chloride salt. Based upon such a yield of fines and assuming that no substantial if any conversion occurred by practice of this invention, a "per cent recycle" of about 16 to 17% would be expected to yield about 39% of fines; about 49% of fines for a 30% recycle; about 63% of fines for a 50% recycle; and about 82% of fines for a 75% recycle. However, in each of Examples 2 to 5 (Table I) and 6 to 13 (Table II), and for the per cent recycle shown therefor, the per cent fines produced were markedly less than the theoretical expected values. On the other hand, use of a mass having an average particle size larger than contemplated herein illustrated by 58 and 80 microns of Examples 14 and 15, respectively, provided a yield of fines substantially equivalent to or in excess of the theoretical expected yield of fines based on the "per cent re- With further reference to use of a mass of controlled particle size characteristics and from the viewpoint of obtaining improved results with respect to "per cent fines," per cent breakdown and decolorizing activity, it is often desirable to correlate the average particle size of the recycled mass with the per cent recycle. Thus, and although as aforesaid, the recycled mass should have an average particle size not exceeding about 50 microns, it is usually preferred to employ a mass having an average particle size of less than about 40 microns at relatively low recycle (e. g. 16–17%) rates, and use of a mass of decreasing average particle size characteristics as the recycle rate is increased, a suitable illustration thereof being the use of a mass having an average particle size of less than about 15 microns at a recycle rate of about 30%.

With reference to the preparation of a mass of desired particle size for practice of this invention and in instances wherein a mass of smaller than desired particles must be reduced in average particle size characteristics, such reduction may suitably be made by use of reducing mills as evidenced by the results shown in the foregoing tables wherein use was made of a micronizer mill, a colloid mill, a hammer mill and ball mill. The specific mills employed were as follows: a dry grinding fluid-energy micronizer mill produced by the Micronizer Company of New York; a wet grinding (aqueous) colloid mill made by the Premier Corporation of Geneva, New York, using 1.25 lbs. of dry solids per gallon of water, a 6-inch Raymond Laboratory hammer mill operating at approximately 13,000 R. P. M. and provided with internal screens; and a wet grinding (aqueous) Abbé ball mill of the porcelain jar type. Thus, and as is evidenced from the data set forth in the foregoing tables, the reduction to controlled particle size characteristics of the smaller than desired particles may be effected by use of wet or dry grinding methods and the controlled particle size mass may be introduced in the described process either in wet or substantially dry form with obtainment of comparable results as shown by comparison of the data for Examples 2 to 5, inclusive, of Table I wherein recycled masses varying over a wide range of water content were employed.

In the tables, the reported data for "decolorizing activity—volume percent Florex Fuller's earth" relates to percolation treatment, with magnesium exchanged percolant-size material, of an undecolorized, undewaxed Pennsylvania lubricating oil stock having an optical density color value of 2460-O. D. color as measured by the method of Ferris and McIlvain as described in Industrial and Engineering Chemistry, Analytical edition 6, 23 (1934) except that a Bausch and Lomb monochromatic green filter was used as the source of monochromatic light. The reported activity values are those obtained as compared to the activity of unused heat tempered Florex Fuller's earth under identical conditions. In the percolation test, the oil was diluted with naphtha to give a solution of 40% oil and 60% naphtha by volume. The oil solution was then run slowly through a bed of the adsorbent, said bed consisting of 100 cc. of adsorbent (measured without tapping), the bed being 21 inches deep. The adsorbent was maintained at approximately 135° F. during filtration of the oil therethrough. When the oil in all of the oil solution which had passed through the filter had reached a color corresponding to a 7 ASTM color as determined by comparisons with samples of known color, the run was considered complete.

As reported herein, the particle size data are based on determination thereof by visual analysis by use of a microscope with a graduated scale and inspection of the particles thereon without orienting the particles under examination. The data reported in the tables for "per cent breakdown," and which data indicates the resistance to attrition of the adsorbents, was determined by the following method:

A 130 cc. sample of the percolant is thoroughly screened by shaking the sample for ten minutes in a Ro-Tap machine. The screened sample is dried for three hours at 275° F. and 95 cc. of the dried sample is measured into a 100 cc. graduate, inverted once, and topped off to exactly 100 cc. The 100 cc. sample, together with ten 5/8-inch steel balls, are placed in the 8-inch bottom pan of a Tyler standard screen set and shaken in the Ro-Tap machine for exactly eight minutes, the tap hammer being disconnected. The steel balls are removed, brushed free of adhering adsorbent, and the adsorbent is transferred to a 60 mesh screen and shaken in the Ro-Tap machine for twenty minutes. The portion of the sample retained on the 60 mesh screen and the portion of the sample that passes through the 60 mesh screen are weighed and calculated as per cent hardness and breakdown values, respectively, of the sample.

Although it is not intended that the present invention be limited to possible theoretical explanations underlying the conversion of the aforesaid smaller than desired particles to desired larger size by practice of this invention, it appears that such smaller particles, but of controlled particle size characteristics, agglomerate between themselves or with the precipitated silicate or both when processed in accordance with this invention. The agglomeration is of unexpected permanency as the larger sized particles from the dried precipitated silicate obtained in practice of this invention withstand, without substantial breakdown, the grinding of the dried precipitate to desired size granular particles and the converted particles maintain their resistance to attrition characteristics even upon being subjected to the aforesaid metal exchange with magnesium. Thus, and although it appears that the desired results of this invention may be due to agglomeration of particles as aforesaid, the term "agglomerate" as used herein and in the appended claims is used for purposes of convenience and with the intent that it is generic to whatever phenomenon or phenomena occurs, inclusive of agglomeration that underlies the obtainment of desired conversion as applied to the process of this invention.

Although the present invention has been described in conjunction with certain preferred embodiments thereof, those skilled in the art will readily recognize that variations and modifications can be made. Such modifications and variations are to be considered to be within the purview of the specification and scope of the appended claims.

We claim:

1. In a process for production of hard granular synthetic alkaline earth metal silicates of percolant size by precipitating under controlled conditions a silicate of an alkaline earth metal replaceable by another alkaline earth metal in a cation or base exchange reaction and which silicate is driable to a hard cake grindable to hard granular particles, drying the precipitate to a hard cake, grinding the cake to a mass of hard granular percolant size particles and a mass of sub-percolant size particles and subjecting said percolant size particles to said cation or base exchange reaction, the improvement, providing for substantial conversion of said mass of sub-percolant size particles to hard granular particles of percolant size, which comprises producing from said mass of sub-percolant particles a controlled size particle mass having an average particle size not exceeding about 50 microns and containing not more than a small amount of particles over about 50 microns in size and introducing said controlled size particle mass into the aforesaid process prior to drying the precipitate.

2. A process, as defined in claim 1, wherein the controlled size particle mass is produced by grinding the mass of sub-percolant size particles.

3. A process, as defined in claim 1, wherein the controlled size particle mass is substantially devoid of particles over about 50 microns in size.

4. In a process for production of hard granular synthetic magnesium silicates of percolant size by precipitating under controlled conditions a silicate of an alkaline earth metal replaceable by magnesium in a cation or base exchange reaction and which silicate is driable to a hard cake grindable to hard granular particles, drying the precipitate to a hard cake, grinding the cake to a mass of hard granular percolant size particles and a mass of sub-percolant size particles and subjecting said percolant size particles to said cation or base exchange reaction, the improvement, providing for substantial conversion of said mass of sub-percolant size particles to hard granular particles of percolant size, which comprises grinding said mass of sub-percolant particles to produce a controlled size particle mass having an average particle size not exceeding about 50 microns and containing not more than a small amount of particles over about 50 microns in size, and introducing said controlled size particle mass into the aforesaid process prior to drying the precipitate.

5. A process, as defined in claim 4, wherein the precipitate is prepared by reaction of a dilute aqueous solution of an alkali metal silicate with a dilute aqueous solution of a salt of an alkaline earth metal replaceable in cation or base exchange reaction with magnesium.

6. A process, as defined in claim 5, wherein the aqueous solution of an alkali metal has a molarity of about 0.08 to about 0.4 based on the metal oxide content thereof and the aqueous solution of the salt of an alkaline earth metal has a molarity of about 0.08 to about 0.4.

7. A process, as defined in claim 6, wherein the alkali metal silicate is sodium silicate and the alkaline earth metal salt is a water-soluble salt of a metal from the group consisting of calcium and mixtures of calcium with magnesium.

8. A process, as defined in claim 4, wherein a controlled particle size mass of decreased average particle size characteristics is introduced into the process as the amount of said mass, based on the weight of the dried precipitated cake, introduced into the process is increased.

RUSSELL J. HAWES.
CHARLES C. WINDING.

References Cited in the file of this patent

UNITED STATES PATENTS

| Number | Name | Date |
| --- | --- | --- |
| 2,146,718 | Bond | Feb. 14, 1939 |
| 2,359,344 | Winding | Oct. 3, 1944 |
| 2,410,284 | Gunness et al. | Oct. 29, 1946 |
| 2,481,841 | Hemminger | Sept. 13, 1949 |
| 2,535,948 | Nicholson et al. | Dec. 26, 1950 |